United States Patent [19]

Borsuk et al.

[11] Patent Number: 4,804,243

[45] Date of Patent: Feb. 14, 1989

[54] CONTACT RETENTION ARRANGEMENT

[75] Inventors: Leslie M. Borsuk, Los Alamitos; Blake F. Woith, Tustin; Patrick G. Corrales, Whittier, all of Calif.

[73] Assignee: ITT Corporation, New York, N.Y.

[21] Appl. No.: 142,367

[22] Filed: Jan. 11, 1988

Related U.S. Application Data

[63] Continuation-in-part of Ser. No. 093,265, Sep. 4, 1987, abandoned.

[51] Int. Cl.$^4$ .............................................. G02B 6/36
[52] U.S. Cl. ................................................. 350/96.20
[58] Field of Search .......................... 350/96.20, 96.22

[56] References Cited

U.S. PATENT DOCUMENTS 3,947,182  3/1976  McCartney ...................... 350/96.22
4,687,288  8/1987  Margolin et al. ................ 350/96.20

Primary Examiner—John D. Lee
Assistant Examiner—Phan T. Heartney
Attorney, Agent, or Firm—Thomas L. Peterson

[57] ABSTRACT

A contact retention arrangement for a fiber optic connector is disclosed in which the retention element for the ferrule connected to the fiber optic cable is formed or shaped with an integral spring which maintains mating ferrules in positive abutment with each other. The contact retention element may either be a contact retention clip mounted in the wall of the contact passage, or a retention clip carried by the ferrule. In the latter arrangement, the clip is designed so that it may be released from either the front or rear of the connector body. The contact retention arrangement may also be used in an electrical connector.

14 Claims, 3 Drawing Sheets

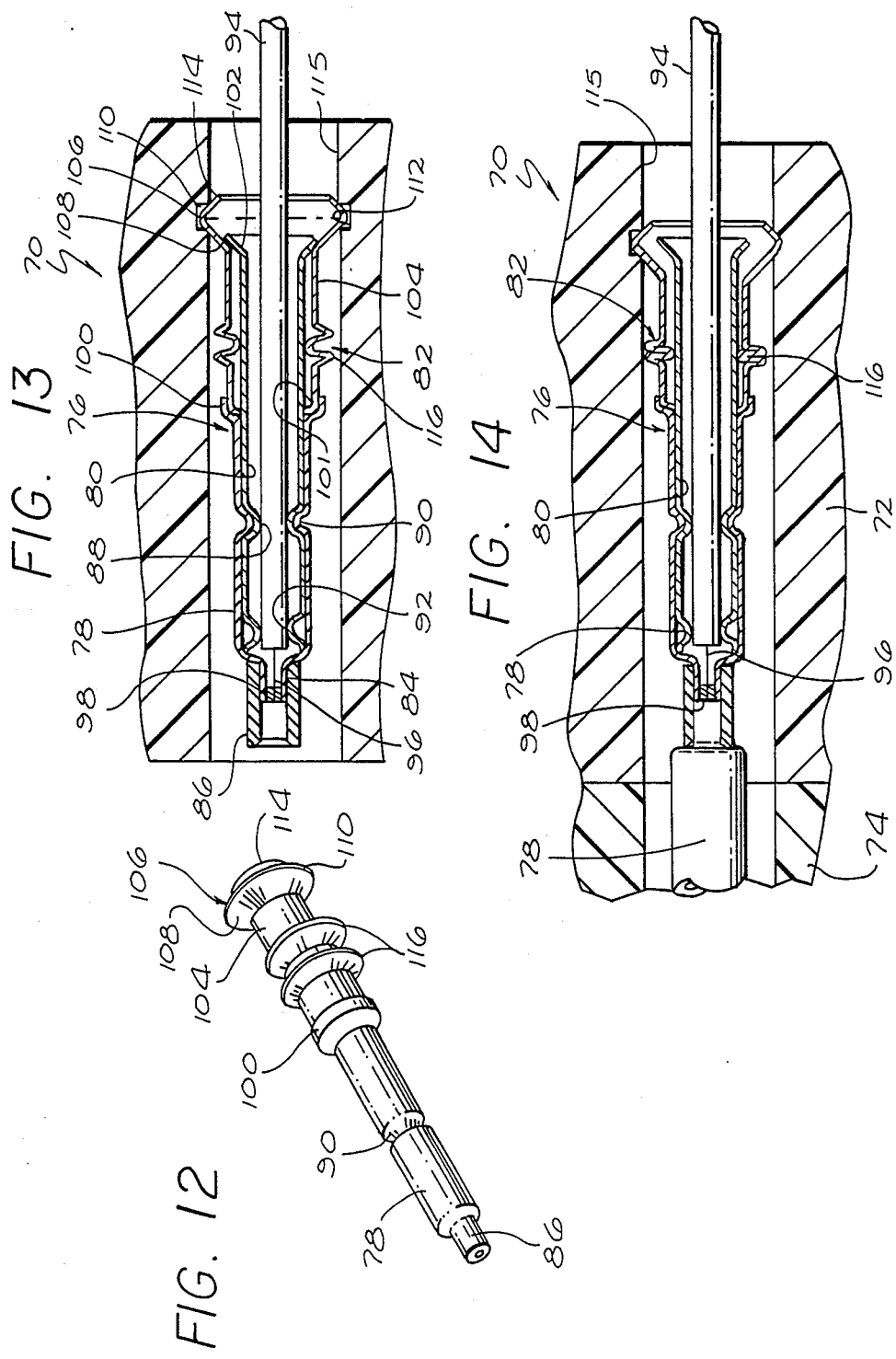

CONTACT RETENTION ARRANGEMENT

CROSS REFERENCE TO RELATED APPLICATION

This application is a continuation-in-part of our copending application Ser. No. 093,265, filed Sept. 4, 1987, entitled "Fiber Optic Connector", now abandoned.

BACKGROUND OF THE INVENTION

The present invention relates generally to a connector and, more particularly, to a contact retention arrangement for the contact element of a connector which is capable of exerting a resilient force on the element.

While the present invention will be primarily described herein as being useful for fiber optic connectors, it may also apply to electrical connectors.

U.S. Pat. No. 3,947,182 to McCartney discloses a contact retention arrangement for a fiber optic connector in which the ferrule is slidably mounted in a sleeve that is removably retained in a contact passage by a contact retention clip mounted in the wall of the passage. A resilient O-ring trapped between the front of the sleeve and a rearwardly facing shoulder on the ferrule is compressed when the ferrule slides rearwardly in the sleeve upon engagement of with a mating ferrule in a second connector member. Compression of the O-ring exerts a resilient forwardly directed force on the ferrule, maintaining the mating ferrules in firm abutment so as to maximize light transmission through the connector at the interface of the mating ferrules. The O-ring also absorbs mating connector tolerances.

Pending application of L. M. Borsuk, et al. entitled "Fiber Optic Contact", Ser. No. 474,755, filed Mar. 14, 1983, now U.S. Pat. No. 4,747,658, assigned to the assignee of the present application, discloses a contact retention arrangement somewhat similar to that disclosed in the McCartney patent in that the ferrule is retained in the connector body by a contact retention clip and a resilient means is provided for urging the ferrule in the forward direction, except in this case the resilient means is a coil spring rather than an O-ring.

U.S. Pat. No. 4,595,251 to Moulin discloses a fiber optic connector in which the contact retention clip is mounted on the ferrule, rather than in the contact passage. As seen in FIG. 14 of the Moulin patent, the ferrule is slidable in a collar which cooperates with the contact retention clip and a shoulder in the contact passage to releasably retain the ferrule in the passage. Bellville springs are disposed between the collar and a rearwardly facing shoulder on the ferrule which resiliently urge the ferrule in the forward direction when the ferrule is pushed rearwardly through the collar upon engagement with a mating ferrule.

U.S. Pat. No. 4,178,068 discloses a fiber optic connector in which the ferrule is slidable in a contact retention clip having outwardly extending retention fingers that engage a shoulder in the wall of the contact passage for releasably retaining the ferrule in the passage. A coil spring is disposed between the front of the contact retention clip and a rearwardly facing shoulder on the ferrule for exerting a resilient fowardly directed force on the ferrule to maintain it in firm abutment with an opposed ferrule when two mating halves of the connector are interengaged.

In each of the prior art connectors discussed above, there is provided a contact retention clip and a separate spring member which adds to the complexity and expense of the connector. Further, in each of such connectors the contact retention clip may be released from only one end of the connector.

It is one object of the present invention to provide a contact retention arrangement for a contact element which produces a resilient force on the element, in a simpler and less expensive manner.

It is another object of the invention to provide a contact retention arrangement for a contact element which may be released from either the front or rear of the connector.

SUMMARY OF THE INVENTION

According to a principal aspect of the present invention, there is provided a contact retention arrangement for a fiber optic connector in which a contact retention clip, which is either mounted in the wall of the contact passage or on the ferrule of the connector, is formed with an integral spring capable of producing significant axial compression upon rearward movement of the ferrule in the passage so that the spring maintains mating ferrules in the connector in positive abutment with each other. With the retention clip being formed or shaped to provide its own spring element, it will be appreciated that a separate spring element such as used in prior art connectors and disclosed in prior art patents is eliminated, thereby reducing the number of parts required in the connector and the cost of manufacture thereof.

According to another aspect of the present invention, there is provided a contact retention arrangement for a fiber optic connector in which the contact retention clip is mounted on the fiber optic ferrule. The clip embodies a radially resilient retention element having a first section that extends from the clip body at an angle to an annular rib portion that projects into an annular groove in the contact passage, and a second section that extends from the rib portion at an angle and direction opposite to the first section. By this arrangement, a contact release tool may be inserted into either end of the contact passage to engage one of the angular sections of the retention element to deflect the element radially inwardly thereby withdrawing the rib from the groove.

According to a further aspect of the invention, the above mentioned contact retention arrangements may be used in electrical connectors containing slidably mating pin and socket contacts.

Other objects, aspects and advantages of the invention will become apparent from the following description taken in connection with accompanying drawings.

BRIEF DESCRIPTION OF THE DRAWINGS

FIG. 12 is an isometric view of an alternative form of contact retention clip according to the invention;

FIG. 13 is a fragmentary sectional view of a connector member showing the assembly of FIG. 12 mounted therein; and FIG. 14 is a fragmentary sectional view showing the connector member of FIG. 13 mated with a second connector member whereupon the integral spring on the contact retention clip is axially compressed.

DESCRIPTION OF THE PREFERRED EMBODIMENTS

Figure 1:
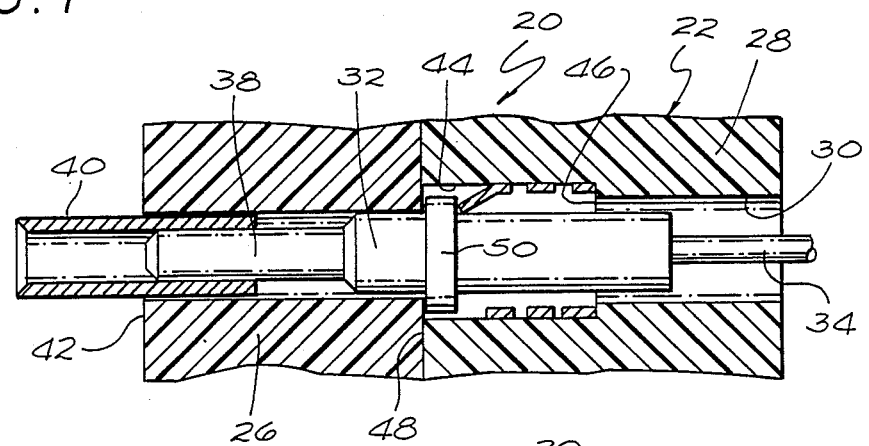
FIG. 1 is a fragmentary sectional view through a connector member embodying a contact retention clip according to one embodiment of the invention, wherein the clip is mounted in the wall of the contact passage.
Figure 2:
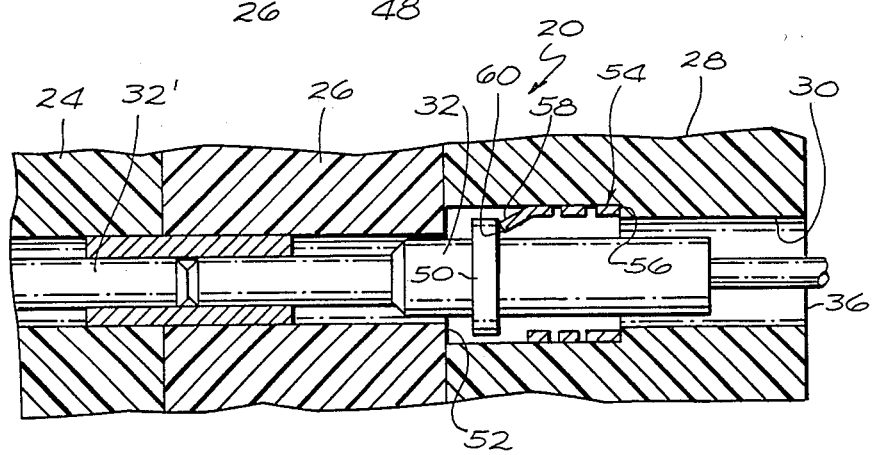
FIG. 2 is a fragmentary sectional view similar to FIG. 1 but showing the connector member mated with the second connector member so that the integral spring formed in the retention clip is axially compressed.

Referring now to the drawings in detail, wherein like reference characters designate like or corresponding parts in FIGS. 1-11, there is shown in FIGS. 1-5 the first embodiment of the invention. As seen in FIG. 2 the connector of the present invention, generally designated 20, comprises a first connector member 22 and a mating second connector member 24. The connector member 22 comprises a body having a front part 26 and a rear part 28. A contact passage 30 extends through the two parts 26 and 28. A hollow fiber optic ferrule 32 is mounted in the passage 30. Normally the connector body will contain a plurality of passages (not shown) each connecting a ferrule. The ferrule is shwon as being connected to a fiber optic cable 34 which extends from the rear 36 of the passage through the ferrule to its forward mating end.

A forward part 38 of the ferrule has a reduced diameter. An alignment sleeve 40 is mounted on the forward part 38 of the ferrule. The sleeve projects forwardly from the front 42 of the contact passage for slidably receiving therein the forward part of a mating ferrule 32' mounted in the second connector 24.

An annular groove 44 is formed in the wall of the passage 30. The groove extends from a forwardly facing shoulder 46 to the front face 48 of the rear part 28 of the connector body. The ferrule 32 is formed with an outwardly extending annular flange 50 which is normally disposed in the groove 44 immediately behind the rear face 52 of the front part 26 of the connector body.

A contact retention clip 54 is mounted in the groove 44 behind the flange 50 on the ferrule. The cliop has a circular body 55. The rear 56 of the clip body bears against the shoulder 46 in the contact passage. Like conventional contact retention clips such as disclosed in the aforementioned McCartney patent, the clip 54 has a plurality of radially resilient contact retention fingers 58, three being shown in FIGS. 3 and 4 by way of example only. The fingers extend forwardly and inwardly from the clip body 55 so that their terminal ends 60 bear against the rear of the flange 50 thereby retaining the ferrule in the contact passage 30 in a forward position, that is, in a position wherein the flange 50 is immediately adjacent to the rear face 52 of the front part 26 of the connector body. When the ferrule 32 is initially pushed into the contact passage from the rear 36, flange 50 will deflect the fingers 58 outwardly until the flange passes the terminal ends 60 of the fingers, whereupon the fingers will snap inwardly to the position illustrated in FIG. 1 where they firmly retain the ferrule in its forward position. In order to release the ferrule so that it may be withdrawn from the contact passage, a suitable tubular tool of a type well known in the connector industry (not shown) is inserted into the rear of the contact passage to deflect the fingers 58 radially outwardly so that the flange 50 can pass freely through the clip and out the passage.

According to the present invention, the contact retention clip 54 is formed with an integral spring which is axially compressed when the ferrules 32 and 32' abut each other upon interengagement of the first and second connector members 22 and 24, as seen in FIG. 2.

The integral spring, designated 62, is formed in the circular body 55 of the clip. The spring is in the form of a helix. The helix is formed by forming the blank illustrated in FIG. 5 into a cylinder about a vertical axis indicated at X. The bottom leg 64 of the blank, when shaped to form the cylindrical body 57, forms a rear split ring section providing the annular shoulder 56 that bears against the shoulder 46 in the contact passage.

FIG. 2 shows how the integral spring portion 62 of the retention clip is axially compressed when the mating ferrules 32 and 32' abut upon engagement of the connector members, causing the ferrule 32 to slide rearwardly in the contact passage. Compression of the spring of the retention clip 54 produces a resilient force urging the ferrule 32 in the forward direction so that it will be maintained in firm abutting engagement with the mating ferrule 32' thereby providing a zero gap between the mating ferrules.

Figure 3:
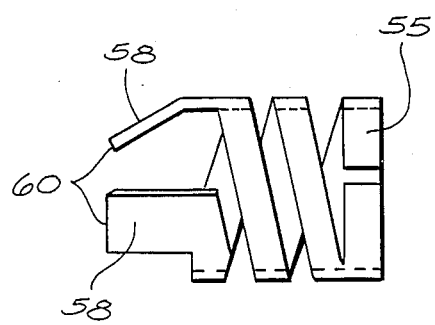
FIG. 3 is a side elevational view of the retention clip illustrated in FIGS. 1 and 2.
Figure 4:
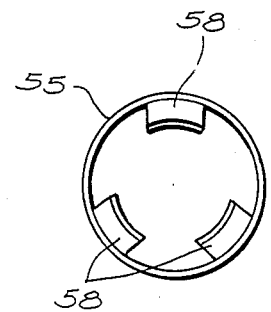
FIG. 4 is a front end view of the clip illustrated in FIG. 3.
Figure 5:
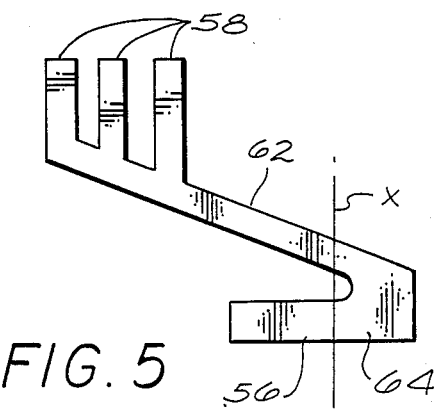
FIG. 5 is a top plan view of the sheet metal blank from which the clip illustrated in FIGS. 3 and 4 is formed.
Figure 6:
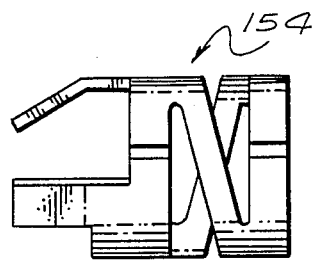
FIG. 6 is a side elevational view of a second embodiment of a contact retention clip which may be used in the connector illustrated in FIGS. 1 and 2.
Figure 7:
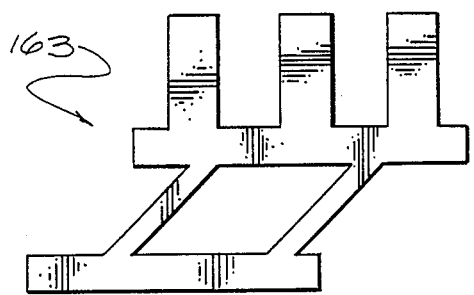
FIG. 7 is a top plan view of the blank from which the clip illustrated in FIG. 6 is formed.
Figure 8:
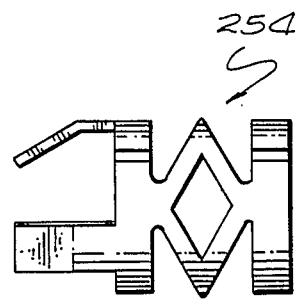
FIG. 8 is a side elevational view of a third embodiment of a retention clip that may be used in the connector illustrated in FIGS. 1 and 2.
Figure 9:
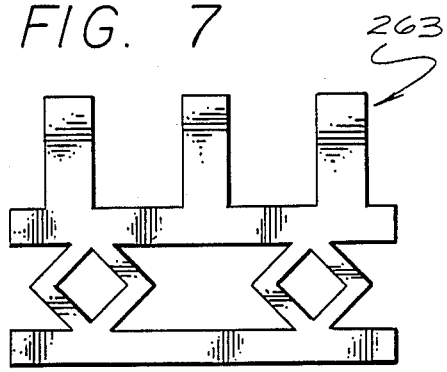
FIG. 9 is a top plan view of the blank from which the clip illustrated in FIG. 8 is formed.

FIGS. 6 and 8 illustrate alternative forms of a retention clip having an integral spring in its cylindrical body similar to that illustrated in FIGS. 3 and 4. The clip 154 shown in FIG. 6 is formed from the blank 163 illustrated in FIG. 7. The clip 254 illustrated in FIG. 8 is formed from the blank 263 illustrated in FIG. 9.

Figure 10:
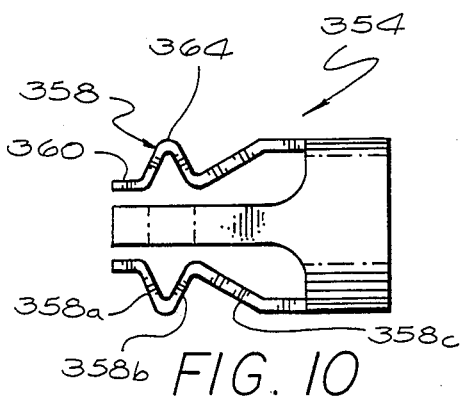
FIG. 10 is a side elevational view of a fourth embodiment of a contact retention clip that may be used in the connector illustrated in FIGS. 1 and 2.
Figure 11:
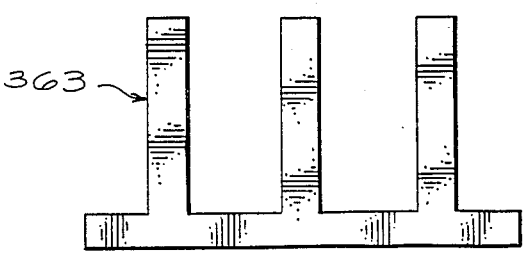
FIG. 11 is a top plan view of the blank from which the clip illustrated in FIG. 10 is formed.

The contact retention clip 354 illustrated in FIG. 10 is somewhat different than the clips described previously herein in that the resilient spring portion 364 of the clip is embodied in the retention fingers 358, rather than in the circular body 355 of the clip. The clip 354 is formed from the blank 363 illustrated in FIG. 11. As seen in FIG. 10, the retention fingers 358 have a corrugated configuration, so that each finger has annular sections 358a, 358b and 358c, with each extending at an angle opposite to that of the next adjacent section. The forward ends 360 of the retention fingers extend longitudinally, and are adapted to engage behind the flange 50 on the ferrule 32. The contact retention fingers are released from behind the flange by the use of a conventional contact release tool that will engage the sections 358c of the fingers, causing the forward ends 360 to deflect outwardly.

Preferably at least the two sections 358a and 358b of the retention fingers extend at an angle greater than 30° relative to center axis of the retention clip 354 to assure that there will be significant axial compression of the fingers when the ferrule is pushed rearwardly in the contact passage in which the clip 354 is mounted. It should be noted here that in a typical contact retention clip such as shown in the McCartney patent or used in electrical connectors, the retention fingers extend at an angle of about 10° to 20° degrees relative to the center axis of the clip to assure that the fingers have a high columnar strength so that the fingers will not deform axially if a rearward force is applied to the contact mounted in the clip. Thus, there is virtually no resilience in the fingers in the axial direction nor is it intended. The retention fingers in a conventional clip are purposely designed to firmly retain a contact in a predetermined axial position, and are deflected only when engaged by a contact release tool, and then only in the radial direction to remove the fingers away from a rearwardly facing shoulder on the contact.

Referring now to FIGS. 12 to 14 in detail, there is shown a fiber optic connector 70 comprising two mating halves 72 and 74 each containing a contact assembly 76, which can best be seen in FIG. 12.

Each contact assembly 76 comprises a ferrule 78, an inner support tube 80 and a contact retention clip, generally designated 82. The ferrule has a reduced diameter forward section 84 on which there is mounted an alignment sleeve 86. The open end of the sleeve slidably receives the forward end of the ferrule in the mating contact assembly 76 when the connector members 72 and 74 are interengaged as seen in FIG. 14.

The support tube 80 is retained in the ferrule 78 by matching inwardly extending annular ribs 88 and 90 formed in the walls of the support 80 tube and ferrule 78, respectively. A second inwardly extending annular rib 92 is formed at the forward end of the support tube 80. The ribs 88 and 92 serve to closely support a fiber optic cable 94 extending into the rear of the contact assembly 76 so that the forward end of the cable will be held substantially on the center axis of the assembly whereby the bare optical fiber 96 of the cable 94 will not bend or droop within the ferrule. The end of the fiber 96 is centered in the forward end of the ferrule by a watch jewel 98.

The rear of the ferrule 78 is formed with a generally L-shaped flange 100 which fits over a flange 101 on the forward end of the forward portion of the retention clip 82. The flange 100, together with a second outwardly extending flange 102 on the rear of the support tube 80, serve to retain the retention clip 82 on the ferrule and support tube, but allows the support tube to slide rearwardly relative to the clip.

The retention clip 82 has a forward generally circular body 104 and a rear retention element 106. The retention element comprises a first section 108 which extends outwardly and rearwardly at a angle from the rear of the circular body 104 to an annular rib portion 110 that projects into an annular groove 112 formed in the wall of the contact passage 115. The retention element 106 also includes a second section 114 that extends downwardly and rearwardly from the rib portion 110 at an angle opposite to the angle of the first section 108. The retention element 106 is radially resilient so that when the contact assembly 76 is pushed into the passage 114 the element 106 will deflect radially inwardly as it slides against the wall of the rear of the passage 114 until the rib portion 110 becomes aligned with the groove 112, whereupon the rib portion will snap out into the groove to retain the contact assembly in the passage. The retention element may be released from the groove 112 by inserting a tubular contact release tool (not shown) into either the front or rear end of the passage 114, engaging respectively either the first section 108 or the second section 114 of the retention element causing the element to be resiliently deflected inwardly to thereby withdraw the rib portion 110 from the groove.

As in the embodiments of the invention disclosed in FIGS. 1–10, the retention clip 82 illustrated in FIGS. 12–14 emboides an integral spring, which is shown as being in the form of a bellows 116 formed in the circular body 104 of the clip. The number of convolutions in the bellows is dependent upon the extent of force that is desired to hold the mating end faces of the ferrules in FIG. 14 engaged with each other. When the connector members 72 and 74 are engaged causing the ferrules to abut, the ferrule 78 of the contact assembly 76 in connector body 72 will be forced rearwardly, causing the support tube 80 to slide rearwardly relative to the retention clip 82 and the bellows to be compressed. This results in a positive abutment force being achieved at the mating interface of the ferrules.

While the spring means embodied in the retention clip 82 is shown as being a bellows, it could also take the form of one of the spring arrangements in the retention clips illustrated in FIGS. 3–8. However, the retention clip 82 with integral bellows spring has the advantage that it can be manufactured relatively inexpensively by use of an eyeletting process, rather than requiring stamping and forming operations as are required for forming the retention clips illustrated in FIGS. 3–10. Further, the ferrule 78 in support tube 80 may also be formed by eyeletting processes so that entire contact assembly 76 may be manufactured at relatively low cost.

The contact retention arrangement of the present invention also has utility in electrical connectors. An electrical connector would have essentially the same structure as the fiber optic connector illustrated in FIGS. 1 and 2, except that hollow ferrule 32 would be a solid pin contact and the mating contact 32' would be a socket contact having an integral cylindrical forward end somewhat similar to the alignment sleeve 40 except that it incorporates a spring beam (not shown) assuring a resilient engagement between the pin and socket contacts. When the mating halves of an electrical connector engage, the pin contacts are supposed to slide into the socket contacts a predetermined axial distance to assure that there is an optimum electrical engagement between the contacts. However, this optimum engagement is not always achieved due to the buildup of axial manufacturing tolerances in the connector, which can result in either the mating pin or socket contacts, or both, shifting rearwardly in their respective contact cavities when the mating halves of the connector are engaged. By use of the contact retention clip of the present invention embodying an integral spring element, the spring will compress when the pin and socket contacts engage thereby accommodating to a significant degree the axial tolerance buildup, thus assuring an optimum electrical engagement between the mating contacts. Thus, each of the embodiments of the invention disclosed herein for a fiber optic connector may also apply to electrical connectors.

Since the present invention is applicable to both fiber optic and electrical connectors, in the claims appended hereto, the term "contact element" has been used to embrace both a hollow fiber optic ferrule and an electrical socket contact or solid electrical pin contact.

Although several embodiments of the invention have been disclosed herein for purposes of illustration, it will be understood that various changes can be made in the form, details, arrangement and proportions of the various parts in such embodiments without departing from the spirit and scope of the invention as defined by the appended claims.

What we claim is:

1. A connector member comprising:
    a connector body having at least one contact passage therethrough having a front and a rear;
    a contact element mounted in said passage and capable of limited rearward movement therein when engaged by a mating contact element in another connector member;
    a homogenous, one-piece contact retention clip associated with said contact element and the wall of said passage releasably retaining said contact element in said passage; and
    a portion of said contact retention clip being shaped or formed to provide an integral spring capable of significant axial compression upon rearward movement of said contact element in said passage, whereby said spring will maintain the mating contact elements in the connector members biased toward each other.

2. A connector member as set forth in claim 1 wherein:
    said spring embodies at least one section that extends at an angle relative to the center axis of said passage greater than about 30°.

3. A connector member as set forth in claim 1 wherein:
    said spring embodies at least two sections that extend at angles opposite to each other.

4. A connector member as set forth in claim 1 wherein:
    said contact retention clip comprises a generally circular body and at least one radially resilient contact retention finger.

5. A connector member as set forth in claim 4 wherein:
    said portion of said contact retention clip in which said spring is provided is said retention finger.

6. A connector member as set forth in claim 5 wherein:
    said retention finger has a corrugated shape.

7. A connector member as set forth in claim 4 wherein:
    said portion of said contact retention clip in which said spring is formed is said circular body.

8. A connector member as set forth in claim 1 wherein said contact retention clip comprises:
    a circular body surrounding and carried by said contact element;
    said circular body embodying a radially resilient retention element extending outwardly and at an angle relative to the center axis of said ferrule; and
    a shoulder in the wall of said passage engaged by said retention element.

9. A connector member as set forth in claim 8 wherein:
    an annular groove is formed in the wall of said passage, one side of said groove providing said shoulder; and
    said retention element embodies a first section extending at an angle to an annular rib portion that projects into said groove, and a second section extending from said rib portion at an angle and direction opposite to said first section whereby a tool may be inserted into either end of said passage to engage one of said retention element sections to deflect said element radially inwardly thereby withdrawing said rib portion from said groove.

10. A connector member comprising:
    a connector body having at least one contact passage therethrough having a front and a rear;
    a contact element mounted in said passage and capable of limited rearward movement therein when engaged by a mating contact element in another connector member;
    a homogenous, one-piece contact retention clip associated with said contact element and the wall of said passage releasably retaining said ferrule in said passage;
    said contact retention clip comprising a generally circular body and at least one radially resilient contact retention finger; and
    said circular body embodying integral spring means providing a resilient force opposing rearward movement of said contact element in said passage, whereby said spring means will maintain the mating contact elements in the connector members biased toward each other.

11. A connector member as set forth in claim 10 wherein:
    an annular groove is formed on the wall of said passage;
    an outwardly extending flange is formed on said contact element;
    said circular body of said contact retention clip is mounted in said groove behind said flange; and
    said retention finger extends inwardly and forwardly with its terminal end positioned adjacent to said flange.

12. A connector member as set forth in claim 10 wherein:
    said circular body is carried by said contact element;
    said circular body embodies a radially resilient retention element extending outwardly and at an angle relative to the center axis of said contact element; and
    a shoulder in the wall of said passage is engaged by said retention element.

13. A connector member as set forth in claim 12 wherein:
    an annular groove is formed in the wall of said passage, one side of said groove providing said shoulder; and
    said retention element embodies a first section extending at an angle to an annular rib portion that projects into said groove, and a second section extending from said rib portion at an angle and direction opposite to said first section whereby a tool may be inserted into either end of said passage to engage one of said retention element sections to deflect said element radially inwardly thereby withdrawing said rib portion from said groove.

14. A connector member as set forth in claim 12 wherein:
    said spring means comprises a bellows formed in said circular body.

* * * * *